Nov. 26, 1968        R. F. SWENSON ET AL        3,412,967
                     RESILIENT SEAT SUPPORT
Filed June 22, 1966                              3 Sheets-Sheet 1
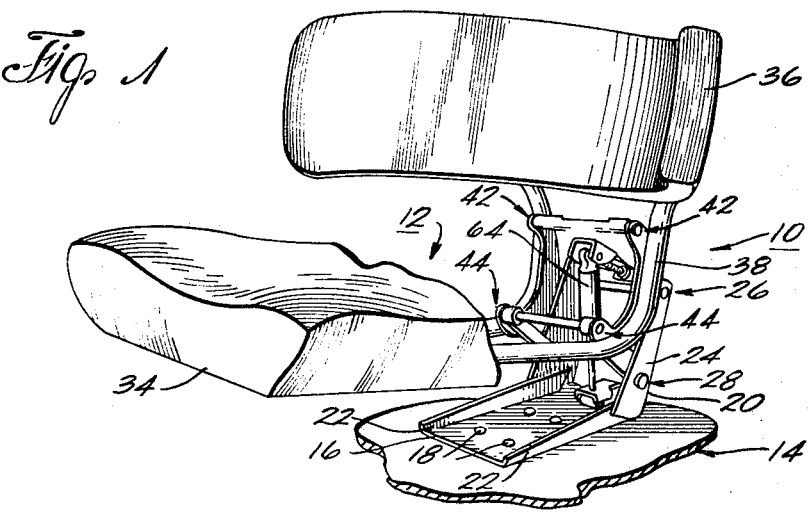
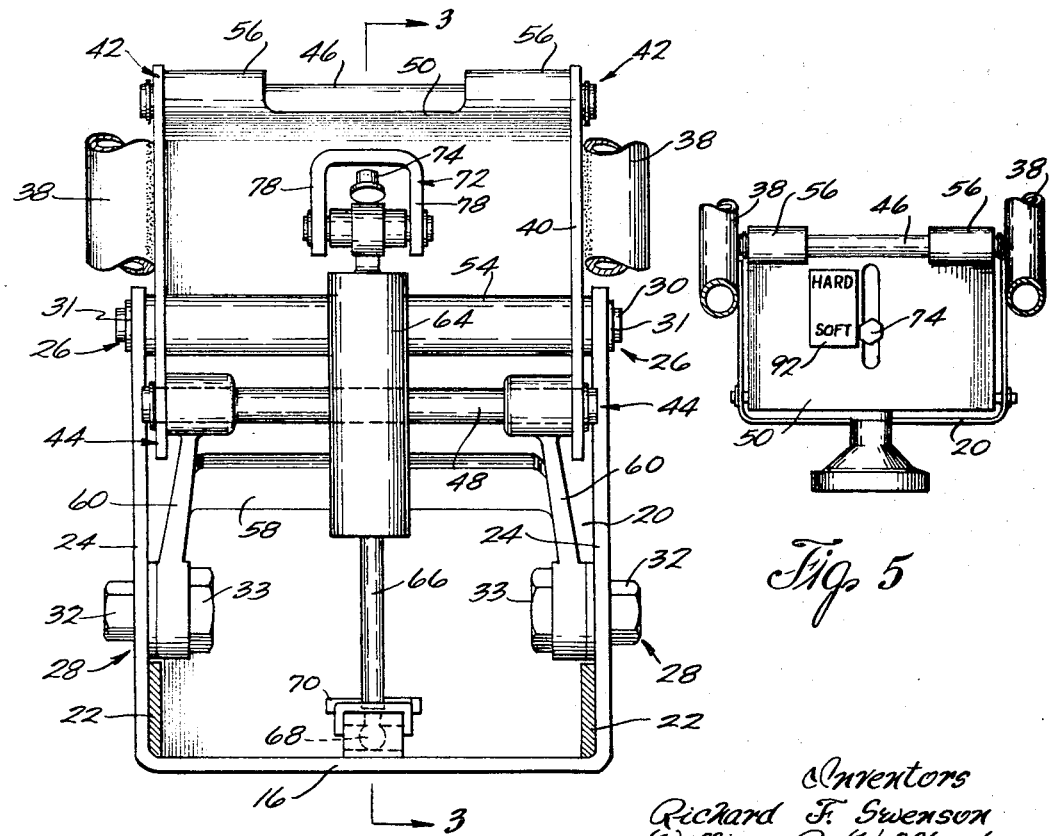

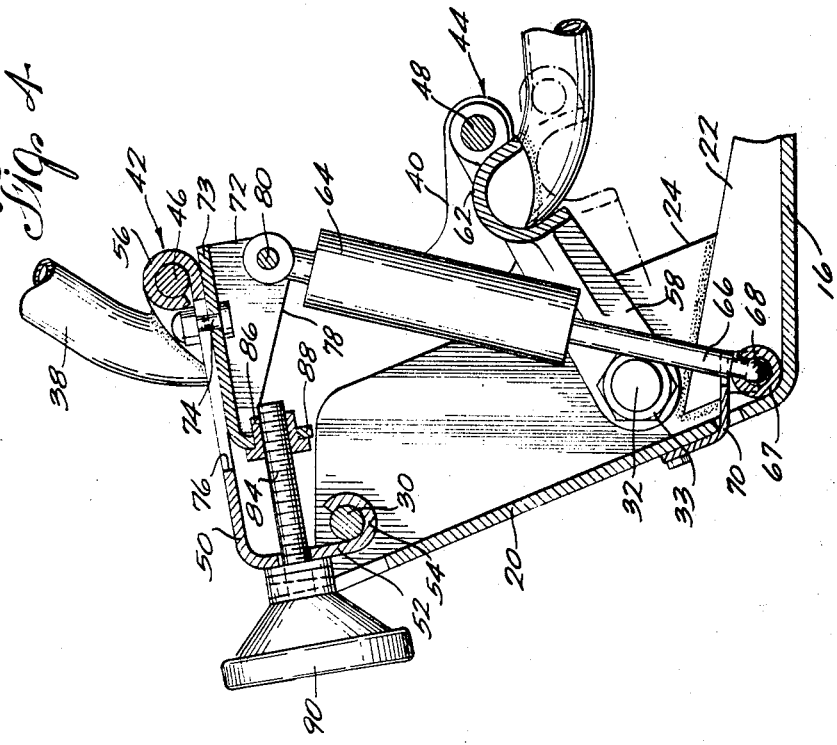

Nov. 26, 1968  R. F. SWENSON ET AL  3,412,967
RESILIENT SEAT SUPPORT
Filed June 22, 1966  3 Sheets-Sheet 3
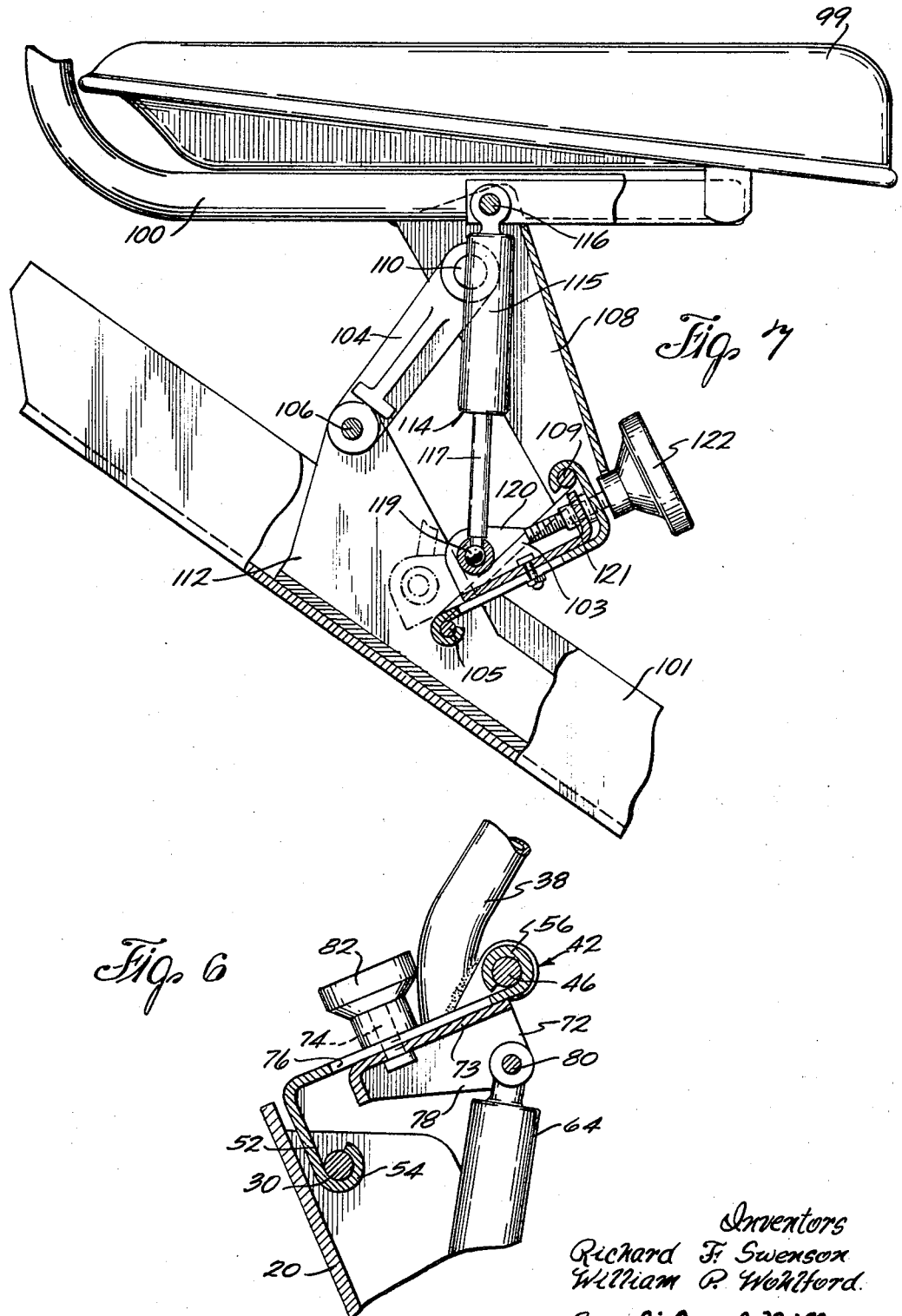
Inventors
Richard F. Swenson
William P. Wohlford
By Lieber & Nilles
Attorney.

United States Patent Office 3,412,967
Patented Nov. 26, 1968

3,412,967
RESILIENT SEAT SUPPORT
Richard F. Swenson, Milwaukee, and William P. Wohlford, New Berlin, Wis., assignors to Swenson Corporation, Redgranite, Wis., a corporation of Wisconsin
Filed June 22, 1966, Ser. No. 559,590
10 Claims. (Cl. 248—400)

ABSTRACT OF THE DISCLOSURE

A resilient vehicle seat suspension embodying a quadrilateral supporting linkage and a gas spring attached at its opposite ends between adjacent sides of the quadrilateral support in a manner whereby the gas spring reacts through one of the seat supporting links to support the seat, the reaction point of the gas spring being adjustable along the one link to vary the position of the seat as well as the effective resistance of the spring to movement under loads placed on the seat.

Background

It is common practice to protect the operators of tractors, bull dozers and other off-road vehicles from discomfort or injury due to shocks or other blows transmitted through the vehicle seat by employing a means in one form or another operating in conjunction with the seat to absorb such shocks. While heavy padding of the seat pan or saddle and the backrest of the seat may absorb a certain amount of shock, it is generally necessary to take further steps in providing a means for mounting and supporting the entire seat on the tractor in a manner that will more effectively absorb the shocks and prevent their transmission to the operator. Such a means generally comprises a seat support having a spring or other elastic means which is loaded by the operator's weight.

The comfort and injury prevention features of such a seat support are primarily dependent upon proper design and utilization of the spring to provide the required amount of elasticity or resiliency thereto. A seat support with little or no resiliency provides insufficient protection to the operator and results in little, if any, improvement over a rigid mounting of the seat. A seat support with excessive resiliency permits the seat bottom out and may even cause injury to the operator in that manner. Proper utilization of the spring in the support is further complicated in that the loading placed on the spring will vary due to differing operator weight or due to variations in the weight of the same operator as caused by changes in clothing or other equipment. Also, the loading placed on the spring will also vary depending on the type terrain being traversed and the magnitude of the shocks which must be absorbed.

The above considerations demands that a satisfactory seat support be adjustable so as to vary the resiliency of the spring means contained therein to insure the comfort and protection to the operator under all conditions, and to allow the operator to vary the ride of the seat to his own, individual preference.

Numerous mechanisms have heretofore been devised in efforts to adjust the resiliency of the spring in the seat support. In general, these mechanisms have varied the compressive or tensile force provided by the spring to support the seat or have varied the relative effectiveness of the spring as by changing positions of the lever arm or other mechanical advantage through which the spring operates. In either event, these prior devices have often been difficult to adjust generally because, in one direction at least, they have required adjustment against the forces generated by the spring.

Additionally, the inclusion of such a mechanism in the seat support have rendered the support bulky and complex, causing it to extend well to the rear of the seat and necessitating mounting of the seat a considerable height above the tractor.

Summary

It is, therefore, an object of the present invention to provide an improved seat support for resiliency mounting the operator's seat on a tractor or other vehicle which obviates the aforesaid disadvantages and objections.

Another object of the present invention is to provide a seat support which includes means for easily adjusting the amount of resilience provided by the seat support, to thereby adjust the support for differing operator weights and operating conditions and vary the ride provided by the seat support.

Still another object of the present invention is to provide a resilient seat support which is simple and compact in construction and which permits a lower mounting of the seat on the tractor than has heretofore been obtainable.

Yet another object of the present invention is to provide a seat support including a self-contained gas spring and a simple and reliable means for mounting the same to vary the relative effectiveness of the spring in supporting the seat and thereby vary the amount of resilience provided by the seat support A further object of the present invention is to provide a seat support including a supporting gas spring providing resiliency thereto, said spring having variable damping characteristics to improve its resilient action.

A more specific object of the present invention is to provide a seating assemblage which includes a resilient suspension comprising, a pair of links each pivotally secured at one end of the base member on spaced pivots and each pivotally secured at the other end to the seat on spaced pivots to provide a quadrilateral support permitting vertical movement of the seat relative to the base member, a gas spring comprising a self-contained cylinder and piston unit pivotally secured between the base member and the seat in a manner whereby one end of the gas spring reacts through one of the links, and means for adjusting the reaction point of the end of the gas spring along the link to vary the angular disposition thereof and the effective resistance of the gas spring to movement under a load placed on the seat.

The drawings

These and other objects of the present invention will be more fully understood by reference to the following detailed specification and drawings forming a part thereof in which:

FIGURE 1 is a perspective view of a vehicle seat including the seat support of the present invention;

FIGURE 2 is a fragmentary front view of the seating assemblage of the invention;

FIGURE 3 is a fragmentary part-sectional view of the seat support taken along the line 3—3 of FIGURE 2 and showing the gas spring adjusted to a position to provide a large amount of resilience to the seat support;

FIGURE 4 is a fragmentary part-sectional view of the seat support similar to FIGURE 3, but showing the gas spring adjusted to a position to provide a small amount of resilience the seat support;

FIGURE 5 is a fragmentary top view of the seat support of the present invention showing portions of the means for adjusting the position of the gas spring;

FIGURE 6 is a fragmentary view showing an alternate embodiment of the means for adjusting the position of the gas spring; and FIGURE 7 is a fragmentary part sectional view similar to that of FIGURE 3 but showing an alternate arrangement for the supporting linkage and adjustment mechanism.

Detailed description

Referring now to FIGURE 1, there is shown therein a seating assemblage 10 embodying the present invention. The seating assemblage 10 is designed to support a seat 12 on a tractor or other vehicle, a part of which is shown by the numeral 14. The assemblage includes a base member 16 which is fastened to the tractor 12 by bolts or studs 18. A riser 20 is mounted at the rear edge of base 16 and slopes rearwardly and upwardly therefrom. Base 16 and seat post 20 may, if desired, be formed from a single sheet of metal bent at the junction of the base and the seat post. Flanges 22 and 24 formed on either side of the base and seat post, respectively, are joined at their overlap, as by welding, to form a rigid structure. While this configuration and method of construction provides numerous advantages, other embodiments and fabrication techniques may, of course, be employed.

The base riser 20 contains two fixed pivot means located in flanges 24. One such pivot, designated by numeral 26, is located in the upper portion of the flanges 24 of the riser, while the other pivot is located in the lower portion of flanges 24 and designated by the numeral 28. A pivot rod 30 extends through flanges 24 at location 26 and may be retained therein by snap rings 31. Rod 30 thus serves as a pivot or hinge pin for additional structure hereinafter described. Other pivot or hinge pins may be extended through each of flanges 24 at the lower pivot point 28, and as shown in FIGURES 2 and 3, these rods or pins may be in the form of bolts 32 which are retained in position by nuts 33.

The seat 12 includes a seat pan or saddle 34 and a backrest 36, both of which may be provided with the usual padding or cushions. Seat pan 34 and backrest 36 are mounted on an L-shaped frame 38, the seat pan 34 being attached to the horizontal portions of the frame member 38 and the backrest being attached to the rear riser portion. The frame member 38 may be formed of tubing or the like and the seat pan and backrest may be suitably secured thereto in a known manner, or frame member 38 could be a structural shell including the cushions.

Each side of the frame member 38 has an arcuate bracket 40 attached to the inner side at or near the juncture of the riser and the seat supporting portion so that the ends of the brackets are located ahead or forwardly of the vertical portions of the frame members. The relationship of 38 and 40 can be varied to suit end configuration, and bracket 40 can be an integral part of frame 38. Each bracket contains a first and second floating pivot point 42 and 44 located at the ends thereof. A pivot pin 46 is carried at the upper pivot point 42 on each bracket 40 while another pivot pin or rod 48 extends through the lower pivot point 44 on each bracket.

The seat 12 is joined to the supporting base 10 by means of two linking members. The first of these is in the form of a rectangular cover plate 50 pivotally connected between the upper fixed pivot pin 30 of the riser 20 and the upper floating pivot pin 46 of the brackets 40. Specifically, plate 50 is formed of a width approximating the distance between flanges 24 and is provided with a depending rear flange 52 rolled to tubular formation to receive the pivot pin or rod 30 mounted through the pivot points 26. The forward end of plate 50 is likewise rolled as at 56 so as to embrace rod 46 located at pivot points 42 on brackets 40.

Seat 12 is additionally coupled to the base member 10 by means of a link 58 pivotally connected between the lower fixed pivot or hinge pins 32 on flange 24 of the base member and floating pivot pin or rod 48 on brackets 40. As shown, the link 58 may be H-shaped with the end portions thereof forming connecting rods journalled on pin 46 and one of the bolts 32 and joined by an intersecting strut 62. Hinge pins 32 may comprise or take the form of a pivot pin (see rod 48) in certain configurations where clearance is provided.

A gas spring 64, mounted between base 16 and the cover plate 50, supports the seat 12 in raised position on base 16 and provides adjustable resiliency to the seat. In general, this spring comprises a sealed cylinder containing gas under pressure. The cylinder also contains a piston reciprocally mounted therein which is provided with damping orifices or valves. A piston rod is mounted on the piston and extends from the cylinder through a gas tight seal, the piston rod being urged to its fully extended normal position by the pressurized gas in the cylinder. When either a compressive or tensive force is applied to the piston rod, the gas pressure in the cylinder generates an opposing force which resists movement of the piston, thus providing a spring-like action to the cylinder. Gas spring 64 may be any common embodiment of this type of spring which provides a resilient action while undergoing compression. A gas spring particularly suitable for use in the present invention is shown and described in detail in U.S. Patent 3,207,498 to Wustenhagen et al. The gas spring shown in that patent provides a different degree of damping for each direction of movement of the piston rod. For example, a small degree of damping may be provided when the spring is compressed and a high degree of damping is provided when the spring is extended. This feature may be employed advantageously as described below.

As shown in the drawings, gas spring 64 is mounted on seat support 10 so that the piston rod 66 extends downwardly. The lower end of piston rod 66 is mounted in a universal joint located at the junction of base 16 and rear riser 20 adjacent to and in approximately vertical alignment with the pivot axis of bolts 32 at the lower pivot point 28 on flanges 24. The universal joint is conveniently formed from a piece of tubing 67, and piston rod 66 terminates in a ball 68 having the same diameter as the internal diameter of tube 67. A circumferential portion of tube 67 is removed for a portion of the length of the tube to allow ball 68 to be inserted in the tube. Ball 68 may be retained in tube 67 by an inverted U-shaped plate 70, mounted on rear riser 20 and covering the removed portion of tube 67. The universal joint thus formed permits the gas spring 64 to function effectively throughout any and all up, down, swaying, and pitching motion of seat 12.

In turn, the upper end of gas cylinder 64 is fastened to a means adjustable forwardly and rearwardly on the link formed by cover plate 50 adjacent to the upper floating pivot 42 so as to increase or decrease the effectiveness of gas spring 64 in supporting seat 12 and thus adjust the resiliency provided by the spring to the seat. This means may comprise a bracket 72 having a base portion 73 abutting cover plate or upper link 50. A bolt 74 extending through base 73 and an elongated slot 76 formed in cover plate 50 retains the bracket 72 on cover plate 50 in its adjusted position along the slot 76. A sidewall 78 depends from each side of the base portion 73, and a pin 80 extends through side walls 78 and the upper end of gas spring 64 to hinge the two together. Bracket 72 may be adjusted between a rearward and a forward position by any suitable means, two typical embodiments of which are shown herein.

In the preferred embodiment shown in FIGURES 3, 4 and 5, a threaded shaft 84 is passed through an aperture formed in the downwardly extending edge 52 of cover plate 50 and is lodged in a threaded collar 86 secured to a flange 88 on base 73 of bracket 72. Knob 90 is carried by the exposed end of threaded shaft 84 to provide a readily accessible means for rotating the shaft. As shaft 84 is rotated in one direction or the other, the threaded collar 86 is advanced or retracted along the shaft, thus moving member 72 to effect desired adjustments. Bolt 74 guided in slot 76 acts as a guide for the bracket member 72. A snap-ring, cotter pin or the like is provided on shaft 84 forwardly of flange 52 and cover plate 50 to react the small fore and aft loads induced by the resilient load at 80.

In the alternate embodiment of FIGURE 6, a knob 82 may be screw threaded to the protruding upper end of the bolt 74. Thus, to effect adjustments, the knob 82 is unscrewed to loosen the same and permit member 72 to be repositioned on cover plate 50, the knob being tightened to lock the member in the desired adjustment position on cover plate 50.

Seat 10 is shown in unloaded position in FIGURES 3 and 4. Gas spring 64 is fully extended, positioning cover plate 50 approximately perpendicular to the rear riser 20 of base 16. Cover plate 50 is thus tilted upward as is link 58. The upward tilt or slant of cover plate 50 and link 58 permits full swinging movement of these members and maximum efficiency in operation of gas spring 64, in a manner hereinafter described, while at the same time maintaining the compactness of the seating assemblage. Locating the pivot points 42 and 44 ahead of frame 38 and the lower end of gas spring 64 in substantially vertical alignment with lower pivot point 28 on flanges 24 adds further compactness and efficiency to the seat support.

In operation, when a load is applied to seat support 10, as by an operator placing his weight on saddle 34, seat 12 tends to move downward. Cover plate 50 and link 58 tend to pivot downward due to the force applied to these linking members through the pivot points 42 and 44 on bracket 40. However, the tendency for cover plate 50 to pivot downward is resisted by the compression of gas spring 64 which is also fastened to the cover plate through member 72. At some point, an equilibrium will be reached between the downward force exerted on cover plate 50 by the operator in the seat and the upward, or resistive, force exerted by gas spring 64 on the same member and the seat will be resiliently supported in that position. The shocks and blows from tractor 14 are thus absorbed by gas spring 64 protecting the operator in the seat.

A previously mentioned, gas spring 64 may be of the type which provides only a slight degree of damping to its resilient action while it is undergoing compression and a high degree of damping to its resilient action while it is recovering or extending. Such a construction permits seat support 10 to respond immediately to compressive loads placed thereon by the operator but prevents the seat from recovering too rapidly and throwing or catapulting the operator when the load on seat support 10 lessens.

To vary the resiliency and shock absorption characteristics provided by seat support 10 and thereby adapt the assemblage to different loads or to adjust for harder or softer rides, the point of equilibrium between the downward force exerted by the operator and the upward force exerted by gas spring 64 is varied by varying the effectiveness of the gas spring in resisting the downward force. Specifically, cover plate 50 may be considered as a simple lever having the fulcrum located at the upper pivot axis 26, with the applied force generated by the downward weight of the operator in seat 12 placed on the outer end of the lever, and the resistive force of the gas spring 64 bearing at an intermediate point on the lever. The point on the lever arm against which gas spring 64 operates is the distance from upper pivot point 26 to the intermediate point on cover plate 50 to which the upper end of the gas spring is hingedly attached, and by increasing or decreasing the effective length of this lever arm by adjusting the position of the hinge connection to thereby vary the angularity of the gas spring, the resisting moment provided by gas spring 64 may be increased or decreased. For example, decreasing the effective length of the lever arm against which gas spring 64 operates, as by moving bracket 72 rearwardly on cover plate 50 as shown in FIGURE 3, decreases the resisting moment and hence the effectiveness of the gas spring in overcoming the downward force of the operator. This lowers the equilibrium point of the seat support 10 and allows seat 12 to ride lower, as shown in the dotted lines in FIGURE 3. A greater amount of elasticity or resiliency is provided to the seat support and the shock absorbing capacity is decreased, and the corresponding ride provided to the operator may be termed soft.

By increasing the effective length of the lever arm through which gas cylinder 64 operates, as by moving bracket 72 forwardly as shown in FIGURE 4, the resisting moment and effectiveness of the gas spring in overcoming the downward force of the operator is increased. This raises the equilibrium point of seat support 10 and causes seat 12 to ride higher in the loaded position, as shown in FIGURE 4 by the broken lines. This also reduces the amount of resiliency provided by gas spring 64 to seat support 10 and stiffens the ride provided by it. The shock absorbing capacity of seat support 10 is therefore increased and the ride provided to the operator may be termed hard.

As shown in FIGURE 5, the position of bolt 74 in slot 76 may be used as an indication of the position of bracket 72 and hence the type of ride provided by seat support 10. Indicium 92 may be affixed to cover plate 50, as shown, to assist the operator in adjusting seat support 10.

While the embodiment shown and described thus far embodies a gas spring which is secured at the bottom to a fixed pivot associated with the base member and pivotally secured at its upper end to an adjustable slide carried by the upper link with the adjustment mechanism for varying the position of the reaction point along the upper link being accessible either from the rear or from the top of the supporting assemblage, it should be understood that the linkage configuration may be inverted or reversed. Referring to FIGURE 7, it will be noted that the vehicle seat 99 and its frame 100 are supported on an inclined base member 101 by a suspension linkage which is, in fact, the reverse of that shown in FIGURES 1 through 6. In this arrangement, a pair of links 103, 104 are each pivotally secured at one end of the base member on spaced fixed pivots 105, 106 respectively. Each of these links is, in turn, pivotally secured at their opposite ends to a floating connecting bracket member 108 on spaced pivots 109, 110, respectively. The links 103, 104 along with the bracket 112 through which they are attached to the base member 101 and the bracket member 108 all cooperate to provide a quadrilateral support permitting movement of the seat relative to the base member as in the case of the support of FIGURES 1 through 6.

In the modification of FIGURE 7, the gas spring 114 has the upper end of the cylinder 115 pivotally attached as at 116 to the seat frame 100 adjacent the upper pivot 110 carried by the floating bracket member 108. The downwardly extending piston rod 117 is pivoted as at 119 to a bracket 120 slideable longitudinally of the lower link 103 adjacent the fixed pivot 105 as by means of a screw threaded member 121 carrying an adjusting handle 122.

Thus, in the structure of FIGURE 7, the upper end of the gas spring 114 is pivoted on a pivot 116 adjacent pivot 110 carried by floating bracket 108 while the lower end thereof is pivoted on a pivot which is adjustable along the lower link adjacent the fixed lower pivot 105 to adjust the position of the reaction point of the lower end of the gas spring and thereby vary the angular disposition of the gas spring and the effective resistance of the spring to movement under a load placed on the seat. It will be noted that in either case, the reaction point between the one end of the gas spring and one of the links is variable in order to vary the effective leverage length as previously described, and as shown in the several modifications, the adjustment knob for varying the location of the reaction point may be positioned to suit conditions.

In any event, it will be noted that the links 50, 58 or the links 103, 104, as the case may be, cooperate with the seat support 40, and base riser 20 or seat support 108 and base member 112 to provide a quadrilateral support. Also, in either case, the gas spring 64 or 114 is attached at its opposite ends between adjacent sides of the quadrilateral support as formed by the members 20, 50 or 103, 108 so that the gas spring reacts through one of the links to support the seat. It is also apparent that in both instances the reaction point of the gas spring is adjustable along the link 50 or 103 in a rectilinear path which intersects the plane of a line drawn through the fixed and floating pivots of the link, thus permitting adjustment to vary both the position of the seat as well as the effective resistance of the spring to movement under loads placed on the seat.

Various modes of carrying out the invention are contemplated as being within the scope of the following claims particularly pointing out and distinctly claiming the subject matter that is regarded as the invention.

We claim:

1. A resilient suspension for supporting a vehicle seat on a base member for adjustment in riding quality, said suspension comprising, a pair of links each pivotally secured at one end to the base member on vertically spaced fixed pivots and each pivotally secured at the other end to the seat on vertically spaced floating pivots to provide a quadrilateral support permitting vertical movement of said seat relative to said base member, a normally fully extended gas spring comprising a self-contained pressurized cylinder and piston unit pivotally attached at opposite ends thereof between said base member adjacent the lowermost of said fixed pivots and said seat adjacent the uppermost of said floating pivots, said points of attachment being located on adjacent sides of said quadrilateral support whereby one end of said gas spring reacts through one of said links to provide the sole means for fixing the normal positions of said floating pivots and said seat, and means for adjusting the reaction point of said one end of said gas spring along said one link in a rectilinear path intersecting the plane of the fixed and floating pivots of said one link to thereby vary the angular disposition of said gas spring and the vertical positions of said floating pivots and said seat as well as the effective resistance of said gas spring to movement under a load placed on said seat.

2. A seating assemblage according to claim 1, wherein the links are disposed one above the other and the gas spring is pivotally secured between a fixed point on the base member and the swinging end of the upper link with the reaction point of the gas spring being adjustable along said upper link.

3. A seating assemblage according to claim 1, wherein the links are disposed one above the other and the gas spring is pivotally secured between the seat and the lower link with the reaction point of the gas spring being adjustable along said lower link adjacent its fixed pivot.

4. A seating assemblage according to claim 1, wherein the links are disposed one above the other and cooperate to provide a parallelogram support with one of the fixed pivots and one of the floating pivots in substantial vertical alinement and the other of the fixed and floating pivots being vertically offset.

5. A seating assemblage according to claim 4, wherein the gas spring is pivotally secured at its opposite ends in proximity to the vertically alined pivots and is swingable about one of its ends toward and away from substantially vertical position.

6. A seating assemblage according to claim 1, wherein the means for adjusting the reaction point of the one end of the gas spring along the one link includes a bracket slidable along said one link in a plane parallel thereto and a rotatable threaded member carried by said one link and cooperating with said slidable bracket.

7. A seating assemblage according to claim 6, wherein the threaded member extends longitudinally of the link carrying the same and the threaded member has a manipulating knob located rearwardly of the seat suspension.

8. A seating assemblage according to claim 6, wherein the rotatable threaded member extends longitudinally of the link carrying the same and the threaded member has a manipulating knob located forwardly of the seat suspension.

9. A seating assemblage according to claim 6, wherein the rotatable threaded member extends perpendicularly through a slot in the link carrying the same and the threaded member has a manipulating knob located below the seat and above said link.

10. A seating assemblage according to claim 1, wherein the gas spring includes an upper cylinder portion adjustably mounted on the upper link and a downwardly extending piston rod which is mounted in a universal joint on the base member.

References Cited

UNITED STATES PATENTS

| | | | |
|---|---|---|---|
| 2,503,796 | 4/1950 | Bruhn | 248—378 XR |
| 2,840,140 | 6/1958 | Harrington | 248—400 XR |
| 2,936,818 | 5/1960 | Harrington et al. | 248—399 |
| 2,991,970 | 7/1961 | White et al. | 248—378 XR |
| 3,006,593 | 10/1961 | Plate et al. | |
| 3,085,778 | 4/1963 | Korn | 248—399 |

FOREIGN PATENTS 562,326    8/1958    Canada.

CHANCELLOR E. HARRIS, *Primary Examiner.*

ROBERT P. SEITTER, *Assistant Examiner.*